(12) United States Patent
Bartscher et al.

(10) Patent No.: US 10,572,987 B2
(45) Date of Patent: Feb. 25, 2020

(54) DETERMINATION OF LOCALISED QUALITY MEASUREMENTS FROM A VOLUMETRIC IMAGE RECORD

(71) Applicants: Volume Graphics GmbH, Heidelberg (DE); Physikalisch-Technische Bundesanstalt, Braunschweig (DE)

(72) Inventors: Markus Bartscher, Edemissen (DE); Thomas Günther, Heidelberg (DE); Christoph Poliwoda, Mannheim (DE); Christof Reinhart, Heidelberg (DE)

(73) Assignees: Volume Graphics GMBH, Heidelberg (DE); Physikalisch-Technische Bundesanstalt, Braunschweig (DE)

( * ) Notice: Subject to any disclaimer, the term of this patent is extended or adjusted under 35 U.S.C. 154(b) by 0 days.

(21) Appl. No.: 15/522,673

(22) PCT Filed: Oct. 29, 2015

(86) PCT No.: PCT/EP2015/002148
§ 371 (c)(1),
(2) Date: Apr. 27, 2017

(87) PCT Pub. No.: WO2016/066265
PCT Pub. Date: May 6, 2016

(65) Prior Publication Data
US 2017/0330317 A1    Nov. 16, 2017

(30) Foreign Application Priority Data
Oct. 30, 2014    (DE) .................. 10 2014 115 851

(51) Int. Cl.
*G06T 7/00* (2017.01)

(52) U.S. Cl.
CPC .. *G06T 7/0006* (2013.01); *G06T 2207/10072* (2013.01); *G06T 2207/10136* (2013.01); *G06T 2207/30164* (2013.01)

(58) Field of Classification Search
CPC ......... G06T 7/0006; G06T 2207/30164; G06T 2207/10136; G06T 2207/10072
See application file for complete search history.

(56) References Cited

U.S. PATENT DOCUMENTS 10,140,703 B2 * 11/2018 Hu .......................... G06T 17/00
10,200,655 B2 *  2/2019 Kim ..................... A61B 5/0073
(Continued)

FOREIGN PATENT DOCUMENTS

WO    2016066265 A1    5/2016

OTHER PUBLICATIONS

European Patent Office, Written Opinion of the International Search Authority for PCT Application No. PCT/EP2015/002148, dated Mar. 21, 2016.
(Continued)

*Primary Examiner* — Brenda C Bernardi
(74) *Attorney, Agent, or Firm* — SoCal IP Law Group LLP; Angelo J. Gaz

(57) ABSTRACT

The invention relates to a method and a device for processing a volumetric image record. The method comprises the following steps: carrying out a non-optical image scanning method on an object to be analysed and generating a volumetric image record and extracting the object contour from the volumetric image record in order to determine the position of the object surface; defining an object surface point and a surrounding area for said object surface point and analysing the grey tones within the surrounding area; calculating a quality value, which reflects the localised quality of the surface, for the object surface point on the
(Continued)

basis of the grey-tone analysis. The device comprises equipment for carrying out the method.

12 Claims, 6 Drawing Sheets

(56) References Cited

U.S. PATENT DOCUMENTS

| | | | |
|---|---|---|---|
| 2009/0037154 A1* | 2/2009 | Ecabert | G06T 7/12 |
| | | | 703/2 |
| 2013/0121564 A1 | 5/2013 | Kitamura | |
| 2019/0050989 A1* | 2/2019 | Hu | G06T 17/00 |

OTHER PUBLICATIONS

International Bureau, Notification of the Recording of a Change for PCT Application No. PCT/EP2015/002148, dated Mar. 30, 2017.
European Patent Office, International Search Report for PCT Application No. PCT/EP2015/002148, dated Mar. 21, 2016.
Kruth J P et al, "Computed tomography for dimensional metrology", CIRP Annals, vol. 60, No. 2, Jun. 3, 2011, pp. 821-842, XP028262022, ISSN: 0007-8506, http://doi.org/10.1016/j.cirp.2011.05.006.
Savio et al: "Metrology of freeform shaped parts", CIRP Annals, Elsevier BV, NL, CH, FR, vol. 56, No. 2, Nov. 22, 2007, pp. 810-835, XP022356750, ISSN: 0007-8506, DOI:10.1016/j.cirp.2007.10.008.
Canadian Intellectual Property Office, Office Action for Canadian Application No. 2,964,021, dated Oct. 4, 2019.

\* cited by examiner

DETERMINATION OF LOCALISED QUALITY MEASUREMENTS FROM A VOLUMETRIC IMAGE RECORD

TECHNICAL FIELD

The present invention relates to a method and an apparatus for calculating, displaying and further processing of local quality criteria from a volume image data record.

DESCRIPTION OF THE PRIOR ART

The nondestructive examination of objects or articles (material or product examination in the industrial field; medical examinations) by means of multidimensional imaging methods is known. Here, image data are captured by means of image scanning methods (image scans) using, inter alia, methods from computed tomography, nuclear magnetic resonance, ultrasonic methods, etc.

It is known that metrology based on data obtained by means of computed tomography (CT data) can be performed. To this end, it is necessary to define or identify a surface in the volume data.

Conventional methods for identifying surface profiles, in particular edge profiles, from image data records and the analysis thereof are described in, for example, "Comparison of surface detection methods to evaluate cone beam computed tomography data for three dimensional metrology" by Heinzl et al. (DIR 2007—International Symposium on Digital industrial Radiology and Computed Tomography, Jun. 25-27, 2007, Lyon, France) and in "Fast and Accurate 3D Edge Detection for Surface Reconstruction" by Bähnisch et al. (Denzler et al. (ed): DAGM 2009, LNCS 5748, pp. 111-120, 2009, Springer Verlag).

Due to the system, CT data contains so-called artifacts (aberrations) which produce superimposing image effects and thus make the unique definition of the surface more difficult. In particular, these artifacts vary on a local level, and so the quality of the surface definition differs on a local level.

In the known methods, information about the quality of the surface definition is not used when applying complicated 3D metrology. However, from a metrological point of view, this information is valuable, as it facilitates an assessment of the measurement and, indirectly, also facilitates a consideration of the uncertainty in the measurement. Here, finding the surface typically is a thresholding process, in which the position of the surface is determined from the reconstructed volume measurement data.

In optical metrology, "invalid" measurement points (e.g. "outliers" as a result of contamination) are simply discarded in the known measurement methods of white-light interferometry and confocal microscopy. To this end, the modulation of the interference signal or the width or signal-to-noise ratio of the confocal signal maximum is evaluated. By way of example, an areal evaluation is carried out by virtue of an image stack being recorded at different positions of the focusing axis and by virtue of subsequently determining the z-position at which the image is in focus at the respective position by way of determining the contrast maximum, as a result of which a surface topography is obtained. However, the procedure when determining the reproducibility in the focus variation cannot be transferred to complex 3D metrology such as e.g. computed tomography because, in this case, it is the focus-dependent local contrast which is evaluated at a measurement point and not, like in the case of computed tomography, the grayscale profile in the 3D measurement volume and the method supplies surface data directly and not, like computed tomography, volume data.

Amirkhanov et al., in "Fuzzy CT Metrology: Dimensional Measurements on Uncertain Data", describe an approach in which a reconstructed 3D image data record is subjected to a statistical analysis in order to identify and visualize the probability for the existence of a surface at each spatial point. There is no more in-depth evaluation.

EP 2 590 139 A1 has disclosed the areal optical three-dimensional measurement of surface topographies, wherein surfaces of objects are recorded by photography and measured on the basis of the principle of focus variation. Depending on the surface geometry, only specific parts of the surface are imaged in focus at the same time, and so a 3D model can be calculated by analyzing the variation of the sharpness during a recording procedure. Grayscale values are not considered here.

SUMMARY OF THE INVENTION

In contrast thereto, a method for processing a volume image data record having the features of patent claim 1 and a corresponding apparatus having the features of patent claim 11 are proposed according to the invention.

The invention is based on the discovery that information about quality properties of the measurement, present in non-optical image data collection, is inherently lost during further processing. However, these information items may be used in the further image data processing as quality variables and may be used for the spatially dependent assessment of measurement results, and therefore also serve to optimize the measurement time.

The prior art does not determine information about the quality of the process when defining an object surface, nor is this information subsequently considered. This information is completely lost, particularly in the case where the surface definition is exported to other software solutions, as it is only the ascertained contours which are then continued to be used therein. A statement in respect of the quality of the measurement at a specific point on the surface is not possible and not made either.

In contrast thereto, the image data information is prepared according to the invention in such a way that quality information is stored for each surface point for the purposes of further processing of the data. By way of example, on the basis of a visualization, the quality information may serve to ensure that even a layperson can immediately identify whether a displayed contour or displayed contour portion is the result of a good or a poor (i.e. influenced by artifacts) surface definition.

Hence, according to the invention, the grayscale structure is analyzed and a quality criterion is calculated for one or more or each surface point in a neighborhood for a surface found according to known methods, said quality criterion reproducing the local quality of the surface and being able to serve as a basis for ascertaining the measurement uncertainty or measurement accuracy. The local signal-to-noise ratio, the reproducibility of the edge finding, normal profiles, the gradient profile, the edge form in relation to the voxel dimensions, parameters resulting from the edge finding such as e.g. the edge width, etc. may, inter alia, find use as a quality criterion.

Hence, according to the invention, the calculation of empirically determinable uncertainty components of a surface point measurement is provided.

The neighborhood within the meaning of the present invention may be a two-dimensional or three-dimensional neighborhood (i.e. a surface or spatial neighborhood), or else a one-dimensional neighborhood (such as e.g. a trajectory). In the first case, the grayscale values are analyzed within the surface neighborhood, in the second case, the grayscale profile is analyzed along the trajectory. Naturally, a plurality of trajectories may also be defined for a given surface point. By way of example, the trajectories may extend perpendicular to the surface (normals through the surface point in the region of the surface).

So-called secondary information items may be considered when analyzing the grayscale values. By way of example, these are information items from the overall volume, such as e.g. statistical information items or information items of other/adjacent model points or else a priori knowledge, for example from available object data. The occurrence of specific so-called "global" effects (such as e.g. Feldkamp artifacts or beam hardening artifacts) may be considered immediately in a real application to the extent that these artifacts are calculable in part without looking at the data (for example, this is the case for Feldkamp artifacts, which virtually only depend on the recording geometry). These effects are calculable for the entire data record (i.e. not only on the surface), as a result of which "global" information is obtained which may be used as a basis for determining the quality value.

The invention therefore permits a statement to be made in respect of how good a given surface point allows conclusions to be drawn about the actual object geometry. Expressed differently: by way of the procedure according to the invention, the user obtains additional information in respect of whether an ascertained contour at a given position reliably reproduces the object geometry or whether this is a surface definition with little significance (on account of measurement errors such as artifacts or the like).

Determining the quality criterion in accordance with the invention may, for example, be carried out by analyzing the grayscale behavior about a given point. The starting point for this is the discovery that an ideal measurement is characterized by specific mathematical parameters (by way of example, an ideal edge profile corresponds to an integral of the normal distribution).

According to the invention, the different quality regions may be visualized for a user by way of the representation of the measurement object such that said user may identify which regions possibly have a poor quality in order to prevent possible incorrect deductions.

By way of example, this representation may be used to assist a user with correctly carrying out an object scan (i.e. in the case of the optimization of the orientation or alignment of the object to be measured, the setting of the beam intensity or of filters or the like) and, in particular, also to assist a user with questions which require a high quality of the measurement in one portion but can tolerate poor qualities in other regions of the object.

Substantial advantages also emerge from taking into account the quality criterion in subsequent evaluations steps, such as e.g. coordinate metrology, registration in respect of CAD data, an intended/actual comparison, a wall thickness analysis, and many more.

Naturally, the invention is not restricted to the methods from computed tomography but may also find application in all other methods of three-dimensional imaging metrology.

Further advantages and configurations of the invention emerge from the description and the attached drawing.

The present description also covers a computer program with program code suitable for carrying out a method according to the invention when the computer program runs on a computer or an image data processing unit. Both the computer program itself and the computer program stored on a computer-readable medium (computer program product) are claimed.

It is understood that the features mentioned above and the features yet to be explained below may be used not only in the respectively specified combination but also in other combinations or on their own, without departing from the scope of the present invention.

The invention is schematically illustrated in the drawing on the basis of an exemplary embodiment and will be described in detail below with reference to the drawing.

DETAILED DESCRIPTION

In the figures, the same elements and also elements with the same function are denoted by the same reference signs.

Figure 1:
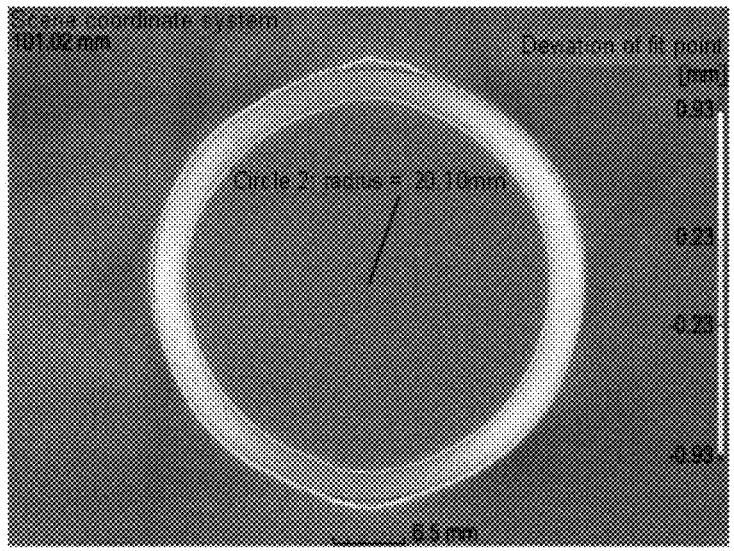
FIG. 1 shows a grayscale value image of a computed tomography measurement of a circular-ring-shaped component for elucidating a determination of a diameter.
Figure 2:
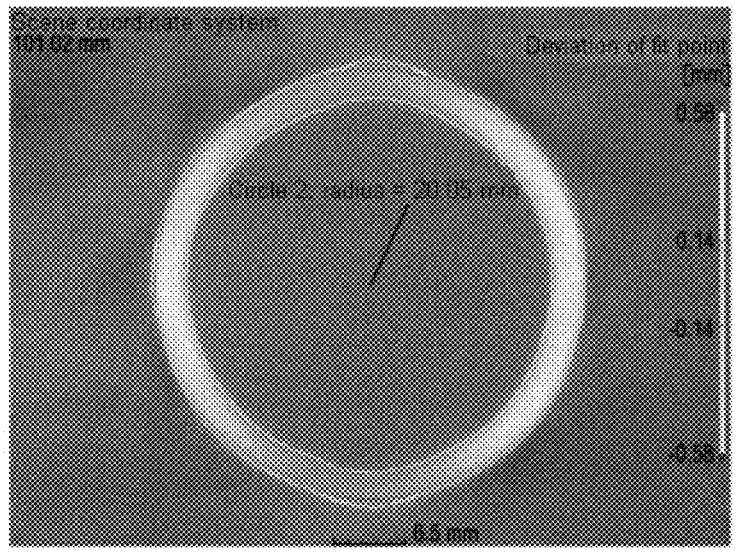
FIG. 2 shows the example of FIG. 1 with a weighting according to the invention of the fitted points on the ascertained contour line.

FIG. 1 elucidates a determination of the (outer) radius or diameter of a circular-ring-shaped component using a conventional procedure and FIG. 2 shows the same example using a determination of the radius according to the invention having a weighting of the fitted points on the ascertained contour line.

FIG. 1 shows a grayscale value image of a computed tomography measurement of a circular-ring-shaped component. The circular ring of the component is depicted in light grayscale values while the background is depicted using darker grayscale values. In the ideal case, the material is white and the background is black, separated by a sharp edge. However, in the depicted real case, the grayscale values are not uniform; the grayscale values of the material vary from a very light gray to a slightly darker gray, the latter particularly in the regions of the circular ring lying at the top and bottom in the illustration of the figure. The grayscale values of the background also vary; beam-shaped artifacts emanating from the ring-shaped material are visible particularly well.

In a manner known per se, so-called fitted points are generated on the ascertained surface (white contour line) (represented in the depicted exemplary embodiment by small crosses or dashes on the outer radius of the circular ring). According to the invention, a quality value is assigned to each of these fitted points, said quality value specifying how well the surface is defined at this position. Subsequently, a circle is fitted by computation into this set of fitted points ("fitted point cloud"), said circle being plotted as a red line in the illustration of the figures.

In the example of FIG. 1, all fitted points lying on the white contour line of the outer circumference of the circular ring are included in the calculation of the circle. The result is a circle with a radius of 20.10 mm.

In the example of FIG. 2, all fitted points whose quality values lie below a predetermined threshold are weighted with zero, i.e. ignored. In the depicted exemplary embodiment, these are the "outlier values" identifiable right at the top and right at the bottom in the illustration of the figure. The result of this circle calculation is a circle with a radius of 20.05 mm. This result which takes the quality values into account reproduces the reality of the measured object in an improved manner. Alternatively, the weighting may range continuously from 1 to 0 depending on the quality criterion, with the fitted points being taken into account in the fitting process in accordance with their weighting.

In metrology, information generally should be obtained as quickly as possible in respect of whether a measured component satisfies the desired quality (such as e.g. observing the tolerance dimensions, material errors, etc.). However, this can only take place if the surface definition determined from the grayscale values does not have any artifacts since deviations from the ideal profile (by way of a comparison, e.g. with a CAD model of the measured object) then correspond to an actual deviation in the real object. If no information about the quality thereof is available for ascertained deviations, a user is not able to readily decide whether, for example, the upper and lower regions depicted in FIGS. 1 and 2 represent material errors/manufacturing errors or measurement errors.

Using the invention, the user is readily put into the position of quickly identifying whether deviations result from artifacts as a result of assigning quality values in the neighborhood of a given measurement point (for example on the basis of a mathematical evaluation of the grayscale profile).

The quality criterion according to the invention may be determined in different ways. In general terms, different methods of considering the grayscale values about a given measurement point, in principle, come into question. By way of example, this may relate to considering grayscale values along a surface normal and/or a gradient analysis and/or the analysis of the signal-to-noise ratio in a region to be defined around the measurement point and/or a consideration of the normal directions of the surface and the variation thereof in the neighborhood of the model point (surface point). Particularly reliable results are obtained if two methods of grayscale value consideration or analysis are combined.

A further option for determining a quality criterion consists in the reproducibility of finding edges, such as e.g. finding an edge point when varying the input parameters (e.g. directions). The quality criterion for the given point emerges from the variation of the edge points found with various parameters; the further the edge points lie apart, the worse the measurement is, and hence also the quality criterion at the given point.

A further option for evaluating an edge lies in producing a fitted model function for reproducing an edge. In particular, the latter may be ascertained iteratively; a larger number of fitting steps leads to a more reliable result (in practice, the number of fitting steps will have to be weighed up against the outlay connected therewith). A comparison between the fitted model function and the measured values then allows an assessment of the measured edge.

Figure 3:
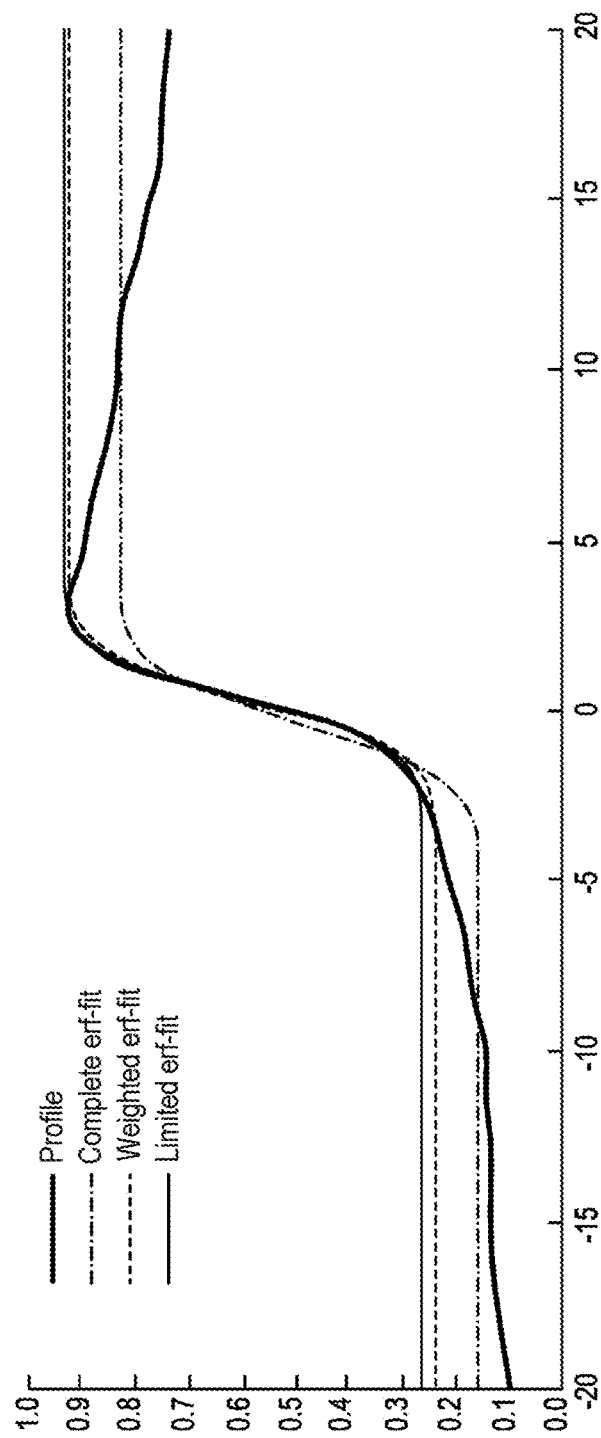
FIG. 3 shows a graphic representation of the results of a fitting process according to the invention.
Figure 4:
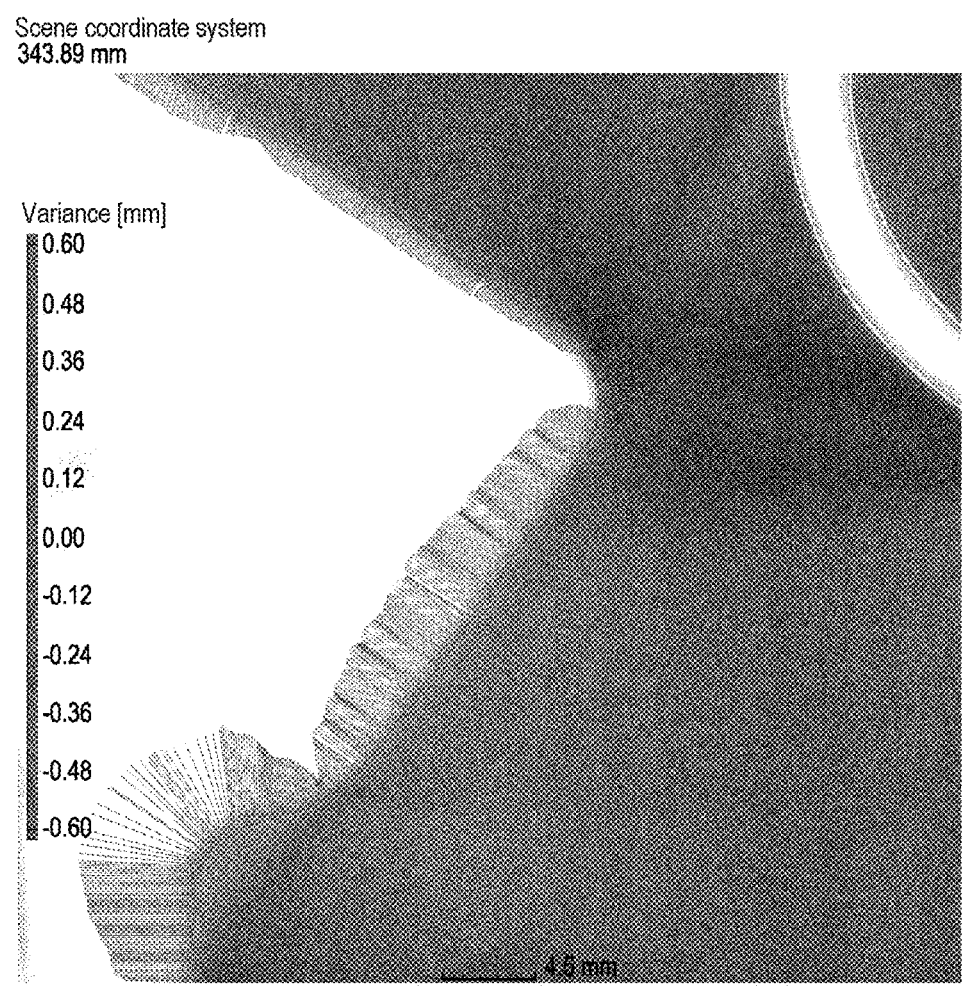
FIG. 4 shows a cut-edge profile with an intended/actual comparison after registration using a conventional best fit method.
Figure 5:
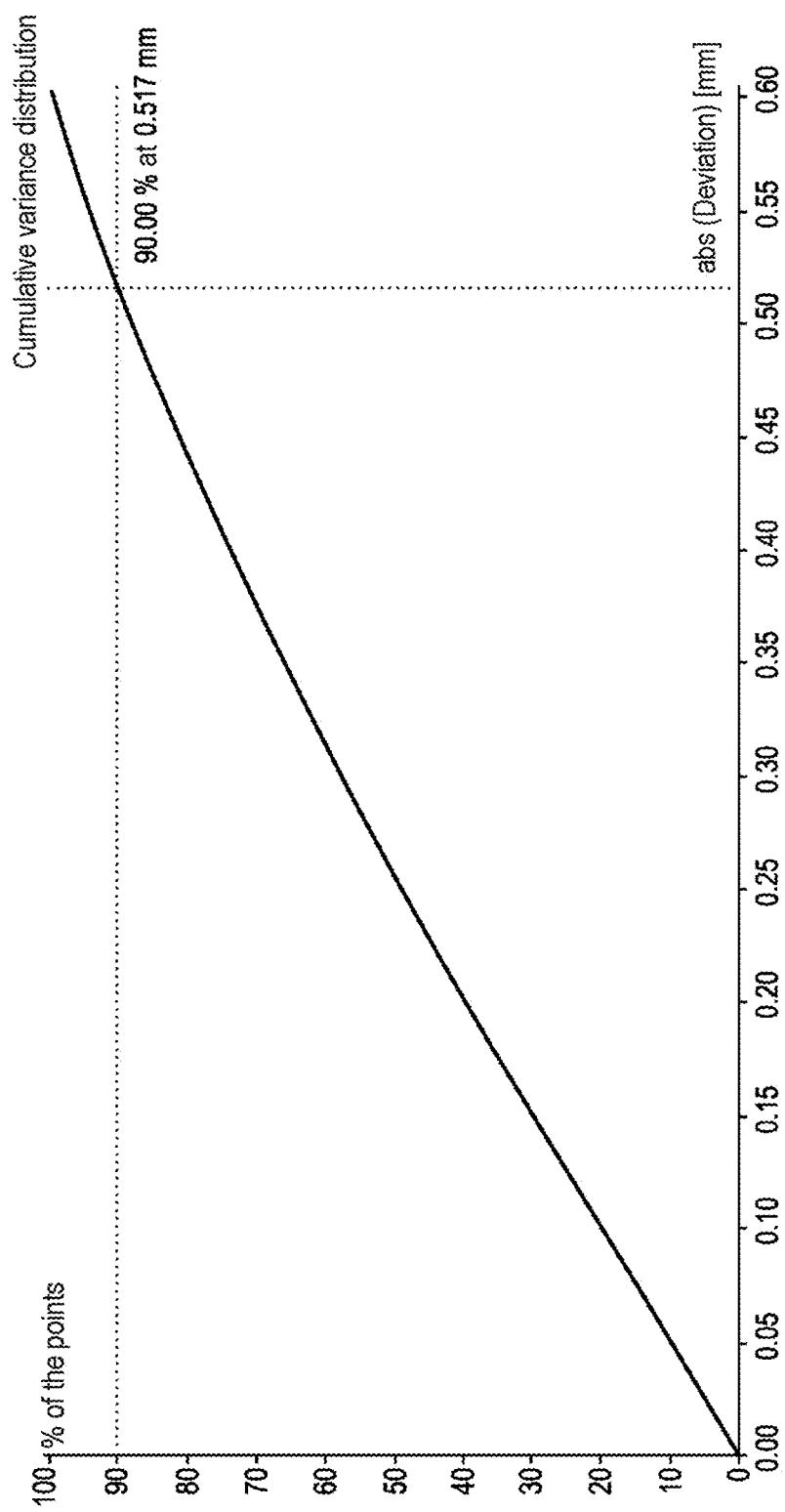
FIG. 5 is a cumulative deviation histogram of the intended/actual comparison of FIG. 4.

On the basis of a diagram illustration, FIG. 3 elucidates a determination of the local quality criterion according to the invention from a grayscale profile by way of fitting a model function with, in the illustrated exemplary embodiment, three fitting steps, more precisely a graphic illustration of the results of the three fitting steps.

For the application in coordinate metrology, the local quality criteria are taken into account as follows: fitted points are generated on the surface definition. Reference elements, such as e.g. planes, cylinders, etc., are fitted into the fitted points obtained thus. In this procedure, the local quality criterion at the location of a given fitted point should, according to the invention, be taken into account. By way of example, this is carried out by virtue of the points being weighted differently depending on the quality criterion thereof. Points with a quality criterion lying below a given threshold are weighted with "0" in the extreme case; i.e., these points are completely ignored during the further processing and further evaluation. Additionally, an averaged quality value may be specified for a fitted reference element (i.e. after the fitting process has been carried out).

FIGS. 6 to 9 likewise elucidate the effect of the invention on the basis of a cutting edge (i.e. an intended/actual comparison of the cutting edge), which was fitted by means of a conventional best fit method on the one hand (FIG. 6) and, on the other hand, was fitted by means of the method according to the invention, taking into account only those cutting edge points with a quality criterion lying above a threshold (FIG. 8). The deviation from the intended value of the ascertained edge is specified in FIGS. 6 and 8 by means of hair lines, wherein the length of the hair lines specifies the size of the deviation. The hair lines are shorter in the illustration of FIG. 8, which accompanies a smaller deviation as a result of the procedure according to the invention.

Figure 6:
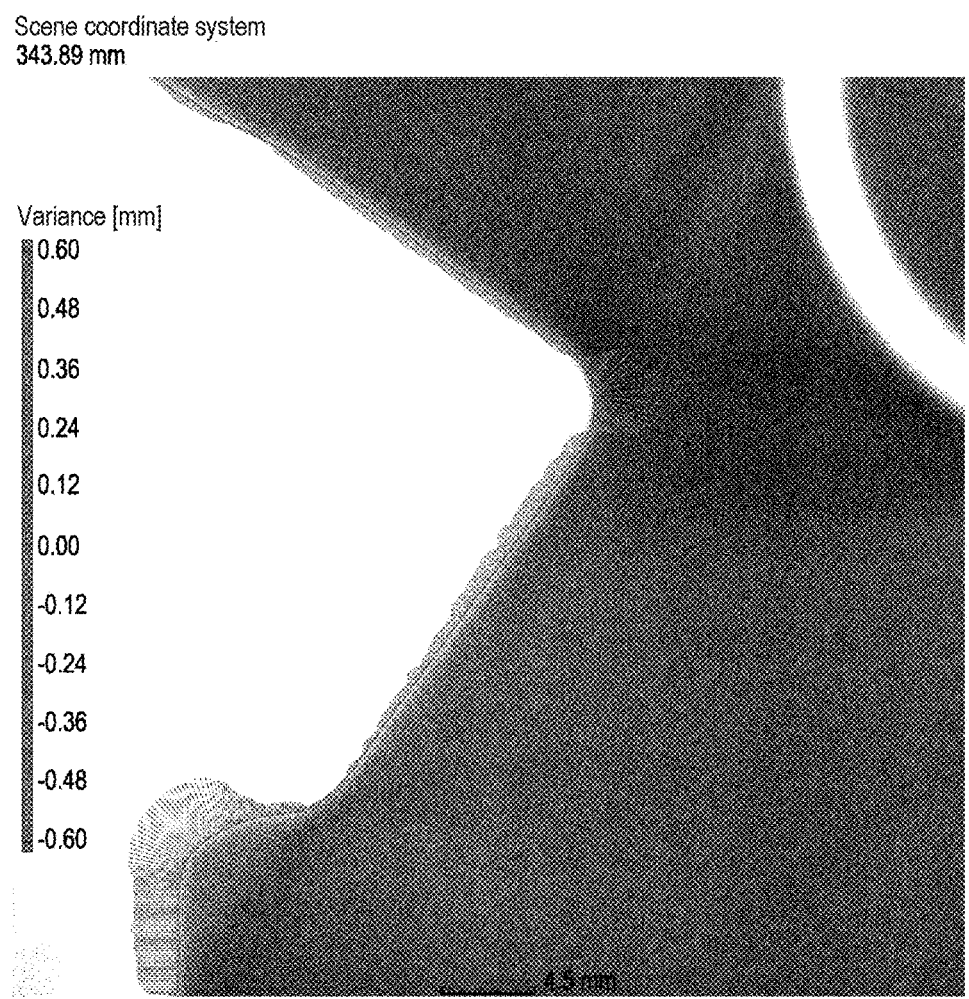
FIG. 6 shows a cut-edge profile with an intended/actual comparison after registration taking into account the quality criterion method according to the invention.
Figure 7:
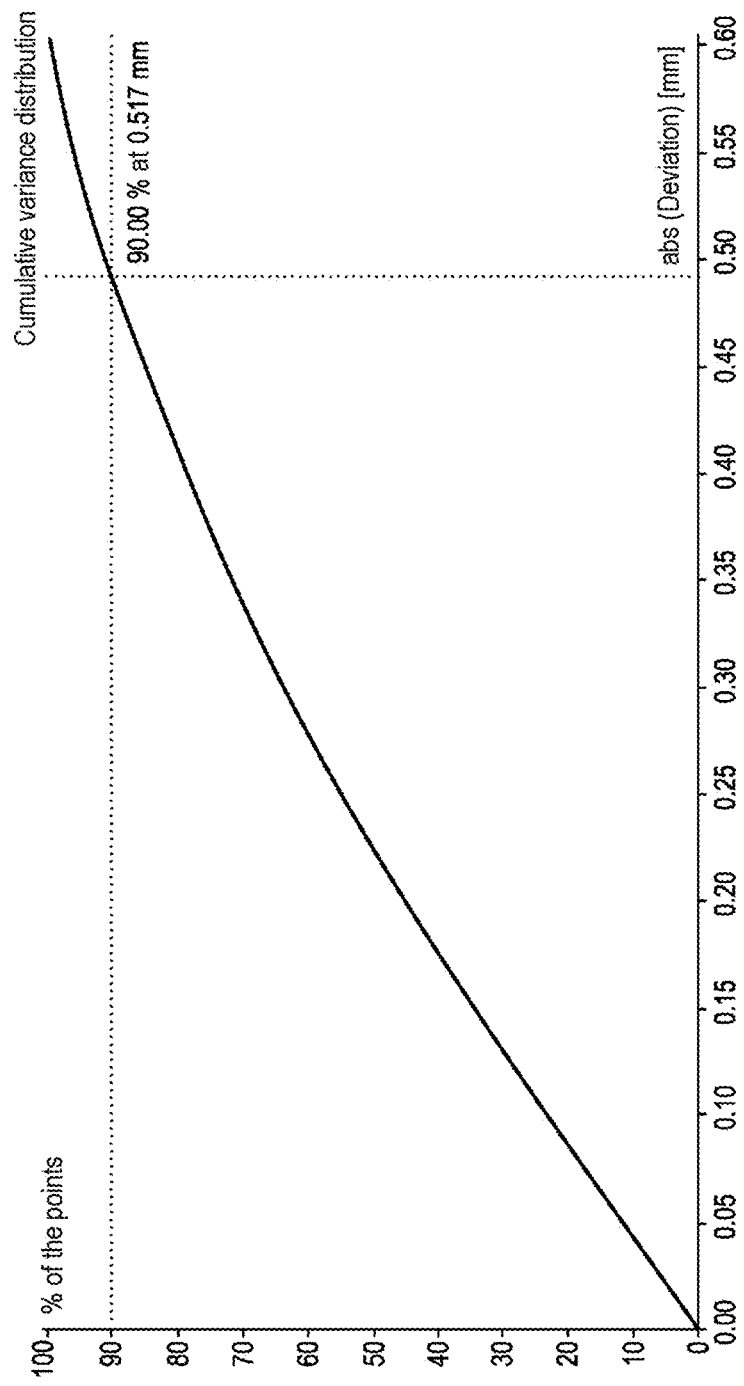
FIG. 7 is a cumulative deviation histogram of the intended/actual comparison of FIG. 6.

FIGS. 7 and 9 reproduce cumulated histograms of the deviations of the cutting edges of FIGS. 6 and 8. A comparison of both diagrams yields that the so-called 90% deviation value when the quality criterion in accordance with the invention is taken into account (FIG. 9), which is 0.492 mm, is significantly smaller than the value in the case of the conventional procedure (FIG. 7), which is 0.517 mm.

It is therefore the goal of the invention also to improve the accuracy in the field of coordinate metrology and in geometric analyses. Further, a use of the invention is also conceivable in, for example, the field of installation monitoring: a test body is examined at temporal intervals and an examination is carried out in respect of whether the quality of the measurement data is constant or whether changes in the installation lead to a loss of quality. It is possible to produce a signal from the measure of the ascertained changes in order to indicate the necessity of servicing the installation (trend analysis) or the necessity of a repair. Large amounts of data are quickly produced during e.g. in-line measurements (in an in-line analysis of products accompanying the manufacturing process). Here, it may be worth initially checking whether an obtained data record is in order (i.e. has a sufficient measurement quality) before a complicated evaluation, which requires much time, is started.

For the purposes of graphical illustration for the user, a histogram relating to the local quality values may be calculated for the complete data record, or for the partial data record, and statistical variables such as the mean value and the standard deviation may be derived therefrom. The histogram and the values may be depicted graphically. Moreover, the user may be provided with the option of defining tolerance intervals. By way of example, using this, it is possible, in the illustrated scenarios, to detect deviations from a normal state ascertained in advance and to warn the user.

New possibilities are opened up for the subsequent processing of image data by way of the proposed quality criterion. By way of example, the overall volume of data to be stored may be significantly reduced by determining the local quality criterion without losing relevant information. The original grayscale value data are then no longer mandatory for the further processing and may be omitted. A metrology user, who works with the contour data record, may profit from a higher precision despite the reduced data volume, for example if the data to be analyzed by said user are subjected to different weighting on the basis of the assigned quality criterion. The invention therefore increases the accuracy in the field of coordinate metrology and in geometric analyses, while simultaneously reducing the amount of data.

The invention also facilitates an improved application in the field of the in-line analysis of products accompanying the manufacturing process since a decision about the quality of a measurement may be carried out very much faster. Moreover, the invention is linked to an improvement in the measurement accuracy, as a result of which the number of pixels or voxels may be reduced; this, in turn, has a very advantageous effect on the measurement and processing speed (and naturally the data reduction).

The invention claimed is:

1. A method for processing a volume image data record, comprising the following steps:
    performing a non-optical image scanning method on an object to be examined and producing a volume image data record and extracting a contour from the volume image data record, the contour defining a model surface,
    setting a model point on the model surface and a neighborhood for the model point and analyzing the grayscale values within the neighborhood,
    calculating a quality value reflecting a local quality of the model surface for the model point on the basis of the grayscale analysis, wherein
    the quality value results from one of an analysis of a signal-to-noise ratio, an analysis of all parameters resulting from an edge finding, an analysis of the reproducibility of the edge finding, a statistical analysis or a feature analysis of the grayscale profiles along at least one trajectory through the model point, a statistical analysis or a feature analysis of the grayscale profiles in the neighborhood, or a combination of two or more of these analyses, and
    wherein the model points are weighted differently depending on the calculated quality value for the purposes of calculating a pictorial reproduction and/or for further analyses of the object to be examined.

2. The method as claimed in claim 1, furthermore comprising the step of ascertaining, on the basis of the quality value, a factor reflecting a measurement uncertainty.

3. The method as claimed in claim 1, wherein the calculating of the quality value is carried out by means of a method or a combination of at least two methods for analyzing the grayscale behavior around a given model point.

4. The method as claimed in claim 1, wherein setting the neighborhood for the model point comprises setting at least one trajectory through the model point and the step of analyzing comprises analyzing a grayscale profile along the trajectory.

5. The method as claimed in claim 1, wherein the step of analyzing comprises taking into account secondary information.

6. The method as claimed in claim 1, wherein weighting is carried out in accordance with one or more of the following rules:
    continuous weighting between 0 and 1,
    those model points whose quality value lies below a predeterminable or predetermined threshold are weighted with zero,
    the model points not weighted with zero are weighted the same or are weighted differently between 0 and 1.

7. The method as claimed in claim 1, wherein a quality information item is assigned to each model point for further processing purposes.

8. The method as claimed in claim 7, wherein the quality information item is visualized.

9. An apparatus for processing a volume image data record, comprising:
    an appliance for performing a non-optical image scanning method on an object to be examined and producing a volume image data record and comprising a computing device programmed to extract a contour from the volume image data record, the contour defining a model surface,
    wherein the computing device moreover is programmed to set at least one of a trajectory and a neighborhood for a model point on the model surface, analyze grayscale profile along the at least one trajectory or analyze the grayscale values within the neighborhood and calculate a quality value for the surface model point for the purposes of reproducing a local quality of the model surface, wherein
    the quality value results from one of an analysis of a signal-to-noise ratio, an analysis of all parameters resulting from an edge finding, an analysis of the reproducibility of the edge finding, a statistical analysis or a feature analysis of the grayscale profiles along the trajectory, a statistical analysis or a feature analysis of the grayscale profiles in the neighborhood, or a combination of two or more of these analyses, and
    wherein the model points are weighted differently depending on the calculated quality value for the purposes of calculating a pictorial reproduction and/or for further analyses of the object to be examined.

10. The apparatus as claimed in claim 9, moreover comprising an indication device by means of which the quality values are indicated.

11. The apparatus as claimed in claim 9, wherein there is different weighting of the model points depending on the calculated quality value, for the purposes of calculating a pictorial reproduction and/or for further analyses of the object to be examined.

12. A computer readable non-transitory storage medium storing program instructions that, when executed, cause an apparatus to perform actions comprising:
    performing a non-optical image scanning method on an object to be examined and producing a volume image data record and extracting a contour from the volume image data record, the contour defining a model surface,
    setting a model point on the model surface and a neighborhood for the model point and analyzing grayscale values within the neighborhood,
    calculating a quality value reflecting a local quality of the model surface for the model point on the basis of the grayscale analysis, wherein the quality value results from one of an analysis of a signal-to-noise ratio, an analysis of all parameters resulting from an edge finding, an analysis of the reproducibility of the edge finding, a statistical analysis or a feature analysis of the grayscale profiles along at least one trajectory through the model point, a statistical analysis or a feature analysis of the grayscale profiles in the neighborhood, or a combination of two or more of these analyses, and wherein the model points are weighted differently depending on the calculated quality value for the purposes of calculating a pictorial reproduction and/or for further analyses of the object to be examined.

\* \* \* \* \*